United States Patent [19]

Maetani et al.

[11] Patent Number: 4,663,573
[45] Date of Patent: May 5, 1987

[54] WEB FEEDING APPARATUS WITH WEB SLOWDOWN

[75] Inventors: Masami Maetani, Ohmiya; Hitoshi Yanagawa, Tokyo, both of Japan

[73] Assignee: Canon Kabushiki Kaisha, Tokyo, Japan

[21] Appl. No.: 798,729

[22] Filed: Nov. 19, 1985

Related U.S. Application Data

[63] Continuation of Ser. No. 559,882, Dec. 9, 1983, abandoned.

[30] Foreign Application Priority Data

Dec. 24, 1982 [JP] Japan ................................. 57-233062

[51] Int. Cl.4 ............................................. B65H 59/38
[52] U.S. Cl. ..................................... 318/6; 242/75.44; 242/75.51
[58] Field of Search .................... 318/6, 7, 98; 242/57, 242/75.44, 75.45, 75.51, 54 R, 71, 71.4, 71.5, 71.6, 75, 75.5, 179, 184, 186, 190, 196

[56] References Cited

U.S. PATENT DOCUMENTS

| | | | |
|---|---|---|---|
| 3,518,857 | 7/1970 | Hancock et al. | 242/57 X |
| 3,629,633 | 12/1971 | O'Callaghan | 318/6 X |
| 3,863,117 | 1/1975 | Paschetto | 318/7 |
| 3,898,436 | 8/1975 | Pottebaum et al. | 242/75.51 X |
| 3,906,299 | 9/1975 | Mittelstaedt | 318/7 |
| 3,979,080 | 9/1976 | Herbert et al. | 242/67.5 X |
| 4,357,560 | 11/1982 | Woo et al. | 318/7 |
| 4,363,457 | 12/1982 | Flint et al. | 318/7 X |
| 4,368,411 | 1/1983 | Kidd | 318/254 |
| 4,438,889 | 3/1984 | Schonmeier | 242/57 X |
| 4,483,492 | 11/1984 | Tokuda et al. | 242/75.51 |

FOREIGN PATENT DOCUMENTS

| | | | |
|---|---|---|---|
| 2364621 | 6/1975 | Fed. Rep. of Germany | 318/7 |
| 55-145961 | 11/1980 | Japan | 242/67.4 |
| 2000622 | 1/1979 | United Kingdom | 242/188 |
| 0964944 | 10/1982 | U.S.S.R. | 318/7 |

*Primary Examiner*—William M. Shoop, Jr.
*Assistant Examiner*—Bentsu Ro
*Attorney, Agent, or Firm*—Fitzpatrick, Cella, Harper & Scinto

[57] ABSTRACT

In a feeding apparatus wherein a web contained in a supply portion is taken up onto a reel, whereby the web is fed along a predetermined path, there is provided control means for rotatively driving the reel by a motor and controlling the driving current of the motor so as to reduce the rotational speed of the reel when the web in the supply portion draws near its terminal end.

5 Claims, 4 Drawing Figures

WEB FEEDING APPARATUS WITH WEB SLOWDOWN

This application is a continuation of application Ser. No. 559,882 filed Dec. 9, 1983, now abandoned.

BACKGROUND OF THE INVENTION

1. Field of the Invention

This invention relates to a web feeding apparatus in which a web such as a microfilm is fed from a supply portion to a take-up portion and taken up onto the reel of the take-up portion.

2. Description of the Prior Art

When a web such as printing paper or film contained in the form of a roll in a supply portion such as a cartridge or a supply reel is to be taken up onto a take-up reel, the take-up reel is rotatively driven by a motor to thereby feed the web. In a search device for finding out particular information from a film having a great deal of information recorded thereon, the film is taken up onto the take-up reel or rewound onto the supply portion at a high speed. The film used with such a search device is provided, for example, with a frame mark on a side edge of the film correspondingly to the frames of the film, and the feeding of the film is controlled by detecting such mark. The vicinity of the terminal end of the film is usually a blank portion called the trailer portion, the terminal end of which is usually secured to the reel of the supply portion. Accordingly, when a desired frame in the film is to be searched for, it is necessary to rewind or stop the film after the last frame of the film has been detected, but if the film is fed at a high speed up to the terminal end thereof on the supply side, a strong impact force may be applied to the terminal end of the film secured to the supply portion to thereby damage mechanical parts or break the film. Thus, heretofore, to detect the terminal end of the film, it has been practised to provide an end mark in the vicinity of the terminal end of the film, namely, on the trailer portion of the film, and to stop the film in response to the detection thereof, but this method required a mark to be specially provided on the film and the labor involved therein is heavy and the working property is poor, and moreover, such method is not applicable to a film having no end mark provided thereon.

SUMMARY OF THE INVENTION

It is an object of the present invention to provide a web feeding apparatus which eliminates the above-noted disadvantages.

It is another object of the present invention to prevent a strong impact force from being applied to the terminal end of a web and thereby prevent the web from breaking.

It is still another object of the present invention to simply detect that the web has been fed up to the vicinity of its terminal end and thereby prevent the apparatus from being damaged even if the web has no mark thereon.

The invention will become fully apparent from the following detailed description thereof taken in conjunction with the accompanying drawings.

DESCRIPTION OF THE PREFERRED EMBODIMENTS

Figure 1:
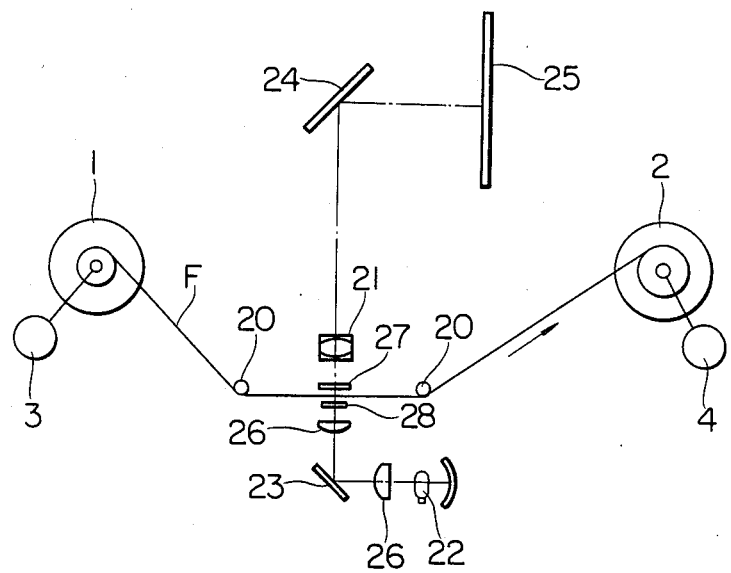
FIG. 1 schematically shows the construction of a film reader to which the present invention is applied.

FIG. 1 shows a microreader to which the present invention is applied and which is of such a construction that driving motors 3 and 4 are coupled to opposed film reels 1 and 2, respectively, and film F is transported from the supply reel 1 to the take-up reel 2 or from the take-up reel 2 to the supply reel 1 by change-over of the drive of the two motors.

For example, if the reel designated by 1 is the supply reel and the reel designated by 2 is the take-up reel, the film F is taken up in the direction of arrow by imparting a rotative drive to the motor 4. The film F passing through the focus position of an imaging lens 21 with the aid of guides 20, is illuminated by an illumination source (lamp) 22 and projected onto a screen 25. Reference numerals 23 and 24 designate reflecting mirrors, reference numeral 26 denotes a condenser lens, and reference numerals 27 and 28 designate transparent glass plates opposed to each other with a film transportation path interposed therebetween.

The motor 3 is connected to the shaft of the supply reel 1 and is revolvable in forward and reverse directions, and the motor 4 is connected to the shaft of the take-up reel 2 and is revolvable in forward and reverse directions. Each of these motors 3 and 4 is preferably a DC motor.

When the film is to be taken up onto the take-up reel 2, the motors 3 and 4 are driven so that the reels 1 and 2 are rotatively driven in the clockwise direction and, when the film is to be rewound onto the supply reel 1, the motors 3 and 4 are rotated so that the reels 1 and 2 are rotatively driven in the counter-clockwise direction. In either case, a greater drive force is imparted to the take-up side motor than to the supply side motor. The terminal end of the film F is secured to the core of the supply reel 1.

Figure 2:
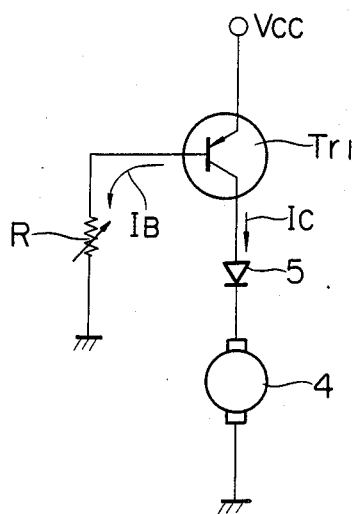
FIG. 2 is a diagram of the control circuit of a film feeding apparatus.

Referring now to FIG. 2 which shows the drive control circuit of the motor 4 used when the film is taken up onto the take-up reel 2, Tr1 designates a transistor, R denotes a resistor, D designates a diode and Vcc denotes a motor driving power source. The transistor Tr1 and the resistor R together constitute a current limiting circuit which controls the current flowing to the motor 4, namely, the driving current of the motor 4. The emitter of the transistor Tr1 is connected to the power source Vcc, the collector thereof is connected to the motor 4 through the diode D, and the base thereof is grounded through the resistor R. The collector current Ic flowing from the emitter to the collector of the transistor Tr1 is the driving current of the motor 4 and the torque of the motor 4 is determined by the collector current Ic.

Between the base current $I_B$ flowing from the emitter to the base of the transistor Tr1 and the collector current Ic, there is established the following relation:

$$Ic = h \cdot I_B \qquad (1),$$

where h represents the current amplification factor which is determined by the transistor used. Accordingly, the collector current Ic is determined by the base current $I_B$.

If the voltage between the base and the emitter is $V_{BE}$, the base current $I_B$ is:

$$I_B = (V_{cc} - V_{BE})/R \qquad (2),$$

where R represents the resistor shown in FIG. 2. As is apparent from equations (1) and (2), Vcc and $V_{BE}$ are constant and therefore, the base current $I_B$ is determined by the value of the resistor R and the collector current will be determined if the base current is determined. Accordingly, if the resistor R is set to a suitable value, the maximum driving current Ic max of the motor 4 during take-up will be determined and the driving current of the motor 4 will never exceed the set current Ic max even if a strong load is applied to the motor.

The resistor R is set as follows. The diameter of the roll of film on the take-up reel 2 becomes maximum when the film F on the supply reel 1 has been fed up to its terminal end, and the resistance value of the resistor R is set so that there is provided a maximum driving current Ic max sufficient to obtain a torque which can rotatively drive the take-up reel 2 at such a speed that no strong shock is imparted to the film at that time. The resistor R is formed into a variable resistor which, when the maximum diameter of the roll of film on the take-up reel varies, is changed to a value corresponding thereto, whereby the value of the maximum driving current Ic max is varied. Where the range of fluctuation of the maximum diameter of the roll of film is not so great, there will be no hindrance even if the resistance value of the resistor R is made constant.

Figure 3:
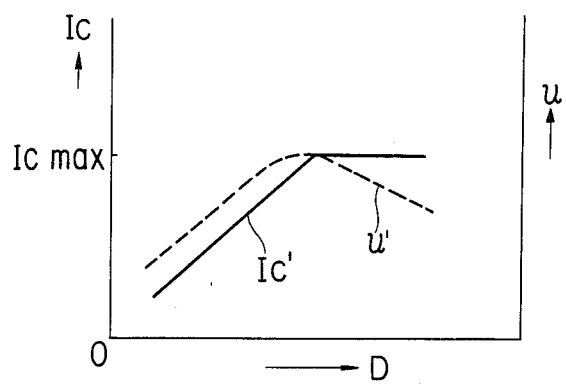
FIG. 3 is a graph showing the relation between the driving current and the film transportation speed.

FIG. 3 is a graph showing the relation among the diameter D of the roll of film on the take-up reel 2, the driving current of the motor 4 and the film feed speed U. Solid line Ic' represents the variation in the driving current Ic for the diameter D of the roll of film, and broken line U' represents the variation in the film feed speed U for the diameter D of the roll of film.

In FIG. 2, diode 5 serves to prevent the counter electromotive force generated by the motor 4.

In the circuit of the above-described construction, the film feeding apparatus may be operated as follows so that the film may be taken up onto the take-up reel 2.

At the initial stage whereat the film F begins to be taken up by the take-up reel 2, as the diameter D of the roll of film on the take-up reel 2 increases, the load of the motor 4 increases and in accordance with such increase, the current Ic flowing to the motor 4 increases. That is, as indicated by solid line Ic' in FIG. 3, as the diameter D of the roll of film (abscissa) increases, the driving current Ic increases. However, once the diameter D of the roll of film reaches a certain value, even if the diameter of the roll of film becomes further greater, the driving current Ic is controlled to a constant value by the transistor Tr1 and resistor R as previously described and is converged to the set maximum driving current Ic max. Since no current exceeding Ic max flows to the motor 4, the torque of the motor 4 is also constant. Accordingly, the rotational speed of the take-up reel is reduced by the increase in the load caused by the increase in the diameter of the roll of film on the take-up reel, and the film transportation speed becomes lower. That is, as indicated by dotted line U' in FIG. 3, as the diameter D of the roll of film increases, the film feed speed becomes higher, but when the diameter D exceeds a predetermined value, the film feed speed becomes lower.

Accordingly, as the film draws near its terminal end, the film transportation speed becomes lower and therefore, the shock occurring when the film F has been wound up to its terminal end is weakened and thus, there is no undesirable possibility of the film being broken or the driving system being damaged. After the film has been wound up to its terminal end, the power source is cut off by an automatic or manual switch (not shown) to complete the feeding of the film. As described above, in this film feeding apparatus, when the load increases for some reason or other, the shock applied to the film F is weakened and therefore, the film can be prevented from being broken. Particularly, when the film has been wound up to its terminal end, this apparatus operates reliably and effectively. According to the experiment, if design is made such that the driving current of the motor 4 becomes maximum when the diameter of the roll of film on the take-up reel becomes about 10 to 20% smaller than the maximum diameter, the film can be prevented from being broken without so greatly reducing to take-up speed.

Figure 4:
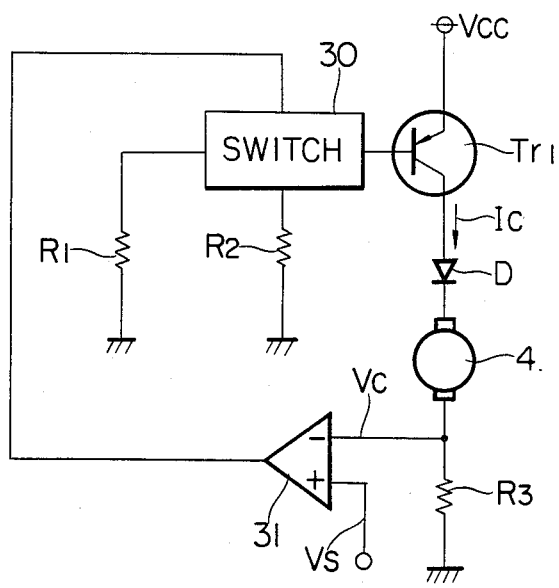
FIG. 4 shows another embodiment of the control circuit.

FIG. 4 shows another embodiment of the motor control circuit. In FIG. 4, elements similar to those in the previous embodiment are given similar reference numerals. $R_1$ and $R_2$ designate resistors for changing the base current $I_B$ of the transistor Tr1, reference numeral 30 denotes a switch for changing over the resistors $R_1$ and $R_2$, $R_3$ designates a resistor for detecting a voltage Vc corresponding to the driving current Ic of the motor 4, and reference numeral 31 denotes a comparator which compares the voltage Vc detected by the resistor $R_3$ with a preset reference voltage Vs and detects that the diameter of the roll of film on the take-up reel has assumed a set value. The comparator 31 comprises an operational amplifier. The resistor $R_1$ is set to a resistance value smaller than that of the resistor $R_2$. The switch 30 normally connects the resistor $R_1$ to the base of the transistor Tr1.

As the early stage of the take-up, namely, when the diameter of the roll of film on the take-up reel 2 is small, the resistor $R_1$ is connected to the base of the transistor Tr1 by the output of the comparator 31 through the switch 30 and, as the diameter of the roll of film on the take-up reel 4 becomes greater, the driving current of the motor increases and the voltage Vc becomes greater, and when the diameter of the roll of film assumes a certain value (smaller than the maximum diameter of the roll of film), the voltage Vc becomes equal to the reference voltage Vs. At this time, the switch 30 is changed over by a signal put out from the comparator 31 and the resistor $R_2$ becomes connected to the base of the transistor Tr1. As a result, the driving current of the motor 4 is reduced and the film feed speed becomes lower than the highest feed speed. Thereafter, the film continues to be taken up and, as the diameter of the roll of film on the take-up reel becomes greater, the film feed speed is reduced, so that the shock applied to the film is weakened when the film has been fed up to its terminal end. According to this embodiment, the film can be fed at a high speed up to the vicinity of its terminal end and, when the film has been fed up to the vicinity of its terminal end, the speed is reduced to thereby prevent the film from being broken or otherwise damaged.

In the foregoing, description has been made of an example in which the core of the take-up reel is rotatively driven by a DC motor, but an AC motor will also permit a similar application.

What we claim is:

1. A web feeding apparatus for feeding a web wound around a rotational shaft on a supply side to a rotational shaft on a take-up side, said apparatus comprising:
    a motor driving the rotational shaft on the take-up side for winding up the web therearound; and
    power source providing means for connecting a power source to said motor;
    wherein said power source providing means; includes limiting means for causing an electric current for driving said motor to increase as the web wound on the take-up side rotational shaft increases, and, after the electric current has reached a predetermined value, for limiting the electric current to the predetermined value in spite of further increase in the amount of web wound on the take-up side rotational shaft;
    wherein said limiting means comprises a transistor and a resistor, the emitter of the transistor being connected to the power source, the collector thereof being connected to said motor, and the base thereof being connected through said resistor to ground.

2. A web feeding apparatus according to claim 1, further comprising a reel, and wherein the web is retained on a said reel and has one end fixed to said reel.

3. A web feeding apparatus according to claim 1, wherein said resistor is a variable resistor.

4. A web feeding apparatus for feeding a web wound around a rotational shaft on a supply side to a rotational shaft on a take-up side, said apparatus comprising:
    a motor driving the rotational shaft on a take-up side for winding up the web therearound; and
    power source providing means for connecting a power source to said motor;
    said power source providing means includes limiting means for causing an electric current for driving said motor to increase as the web wound on the take-up side rotational shaft increases, and after the drive electric current has reached a predetermined value, limiting the motor drive electric current to the predetermined value in spite of further increase in the amount of web wound on the take-up side rotational shaft;
    said limiting means comprising detecting means for detecting a voltage corresponding to the electric current for driving said motor, and means for comparing said voltage detected by said detecting means with a reference voltage so as to control said electric current for driving said motor in accordance with said comparison.

5. A film drive apparatus for feeding a roll of film to a take-up shaft, a feed-up end of said film being fixed to a rotation shaft and a leading end of said film being wound around a take-up shaft, comprising:
    a motor for driving said take-up shaft to take up the film around said take-up shaft;
    control means for controlling an electric current supplied to said motor, said control means comprising supply means for supplying a voltage, a transistor the emitter of which is connected to said supply means and the collector of which is connected to said motor, and a resistor connected between the base of said transistor and ground for limiting a maximum value of electric current supplied to the collector of the transistor.

* * * * *

UNITED STATES PATENT AND TRADEMARK OFFICE
CERTIFICATE OF CORRECTION

PATENT NO. : 4,663,573

DATED : May 5, 1987

INVENTOR(S) : MASAMI MAETANI, ET AL.

It is certified that error appears in the above-identified patent and that said Letters Patent is hereby corrected as shown below:

COLUMN 5

Line 12, "means; includes" should read --means includes--.

Signed and Sealed this

Tenth Day of November, 1987

Attest:

DONALD J. QUIGG

Attesting Officer

Commissioner of Patents and Trademarks